US012242210B2

(12) United States Patent
Tamaki et al.

(10) Patent No.: US 12,242,210 B2
(45) Date of Patent: Mar. 4, 2025

(54) DEVELOPING DEVICE OF A NON-MAGNETIC ONE-COMPONENT DEVELOPMENT TYPE CAPABLE OF SUPPRESSING TONER MELT ADHESION TO A REGULATION BLADE AND IMAGE FORMING APPARATUS INCLUDING THE SAME

(71) Applicant: KYOCERA Document Solutions Inc., Osaka (JP)

(72) Inventors: Tomohiro Tamaki, Osaka (JP); Masahito Ishino, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 18/502,844

(22) Filed: Nov. 6, 2023

(65) Prior Publication Data

US 2024/0160123 A1 May 16, 2024

(30) Foreign Application Priority Data

Nov. 14, 2022 (JP) ................................ 2022-181638
Mar. 27, 2023 (JP) ................................ 2023-049467

(51) Int. Cl.
*G03G 15/08* (2006.01)

(52) U.S. Cl.
CPC ..... *G03G 15/0812* (2013.01); *G03G 15/0818* (2013.01); *G03G 2215/0614* (2013.01); *G03G 2215/0863* (2013.01)

(58) Field of Classification Search
USPC .......................................................... 399/284
See application file for complete search history.

(56) References Cited

U.S. PATENT DOCUMENTS 5,565,968 A * 10/1996 Sawa ................ G03G 15/0818 430/123.3
6,195,522 B1 2/2001 Sato ............................ 399/284
2005/0226659 A1* 10/2005 Ebe .................. G03G 15/0818 399/286

(Continued)

FOREIGN PATENT DOCUMENTS

JP 2000-155465 A 6/2000
JP 2005-309011 A 11/2005
JP 2017-116920 A 6/2017

*Primary Examiner* — Quana Grainger
(74) *Attorney, Agent, or Firm* — Stein IP, LLC

(57) ABSTRACT

A developing device includes a development container, a developer carrying member, and a regulation blade. The development container is for containing a non-magnetic one-component developer composed only of the toner. The developer carrying member is manufactured by a polishing method and includes a rotary shaft and a roller portion stacked on an outer circumferential surface of the rotary shaft, and a toner layer is formed on the roller portion. The regulation blade contacts the outer circumferential surface of the roller portion so as to regulate a thickness of the toner layer. When ten-point average roughnesses in a circumferential direction and in an axial direction of the roller portion are indicated as Rz1 and Rz2, respectively, $Rz1/Rz2 \leq 1.5$ is satisfied, and a contact linear pressure of the regulation blade with respect to the roller portion is not less than 15 [N/m] and not more than 40 [N/m].

8 Claims, 9 Drawing Sheets

(56) References Cited

U.S. PATENT DOCUMENTS

| | | | | |
|---|---|---|---|---|
| 2007/0212630 | A1* | 9/2007 | Yasunaga | G03G 9/09725 430/119.86 |
| 2009/0092421 | A1* | 4/2009 | Sato | G03G 15/0818 399/280 |
| 2013/0078006 | A1* | 3/2013 | Kawashima | G03G 15/0818 399/286 |
| 2017/0176886 | A1 | 6/2017 | Nagatomo et al. | |
| 2022/0404734 | A1* | 12/2022 | Nakaue | G03G 9/08 |

* cited by examiner

RESULT OF OBSERVATION

DEVELOPING DEVICE OF A NON-MAGNETIC ONE-COMPONENT DEVELOPMENT TYPE CAPABLE OF SUPPRESSING TONER MELT ADHESION TO A REGULATION BLADE AND IMAGE FORMING APPARATUS INCLUDING THE SAME

INCORPORATION BY REFERENCE

This application is based upon and claims the benefit of priority from the corresponding Japanese Patent Applications Nos. 2022-181638 (filed on Nov. 14, 2022) and 2023-49467 (filed on Mar. 27, 2023), the entire contents of which are incorporated herein by reference.

BACKGROUND

The present disclosure relates to an image forming apparatus using an electrophotographic process, such as a copy machine, a printer, or a facsimile, and relates particularly to a developing device of a non-magnetic one-component development type and an image forming apparatus including the same.

Known types of developing devices used in image forming apparatuses employing an electrophotographic method, such as a copy machine, a printer, a facsimile, and a multi-functional peripheral equipped with functions of these apparatuses, include a two-component development type using a toner and a carrier as a developer and a one-component development type using only a toner without using a carrier.

In a developing device of the non-magnetic one-component development type using a non-magnetic toner, a regulation blade as a developer regulation member is disposed so as to be in contact with a surface of a developing roller that is a developer carrying member. Further, the toner is conveyed by microscopic asperities provided on the surface of the developing roller and is regulated by the regulation blade so that any excess of the toner is removed, thus being formed into a thin toner layer. Furthermore, when passing below the regulation blade, the toner rubs against the regulation blade and the surface of the developing roller and thus becomes charged. Further, a photosensitive member and the developing roller are rotated in contact with each other, and thus, under an electric field, the toner on the surface of the developing roller is developed on the photosensitive member.

The non-magnetic one-component development type described above presents a problem that melting of the toner might occur due to frictional heat generated between the regulation blade and the rotating developing roller, resulting in sticking (melt adhesion) of the molten toner to the regulation blade. Such toner sticking to the regulation blade may lead to a case where the toner that has already stuck grows to a size of several tens to several hundreds of μm as a result of further toner sticking thereto, thus interfering with formation of a toner layer on the developing roller to cause occurrence of white streaks in an image. In order to obtain high-quality images over a long time of use, it is an issue of great importance to suppress toner sticking to the regulation blade.

To this end, there has been used a toner in which particulates of silica or the like are added as an external additive to surfaces of toner base particles such as of polyester. The external additive serves to improve fluidity and chargeability of the toner and also to prevent the toner base particles, which are relatively soft and thus are likely to be deformed, from directly contacting a surface of the regulation blade. Through the use of this toner, toner sticking to the regulation blade as described above is suppressed. In a case, however, where the toner repeatedly passes below the regulation blade due to endurance printing, the external additive might be embedded into the toner base particles or detached from the toner base particles, thus bringing the surfaces of toner base particles to an exposed state (for the sake of convenience, this phenomenon is referred to as toner deterioration). As a result, toner sticking to the regulation blade becomes likely to occur. Accordingly, toner sticking to the regulation blade is likely to occur in a latter half of a life (a service life) of the developing device.

SUMMARY

A developing device according to an aspect of the present disclosure includes a development container, a developer carrying member, and a regulation blade and supplies a toner to an image carrying member on which an electrostatic latent image has been formed. The development container is for containing a non-magnetic one-component developer composed only of the toner. The developer carrying member includes a rotary shaft and a roller portion that is stacked on an outer circumferential surface of the rotary shaft and is brought into pressure contact at a prescribed pressing force with the image carrying member, and on an outer circumferential surface of the roller portion, the toner is carried to form a toner layer. The regulation blade contacts the outer circumferential surface of the roller portion so as to regulate a thickness of the toner layer formed on the outer circumferential surface of the roller portion. The developer carrying member is manufactured by a polishing method in which the roller portion being rotated about the rotary shaft is contacted by a grindstone so as to be polished. When a ten-point average roughness in a circumferential direction and a ten-point average roughness in an axial direction of the roller portion are indicated as Rz1 and Rz2, respectively, $Rz1/Rz2 \leq 1.5$ is satisfied, and a contact linear pressure of the regulation blade with respect to the roller portion is not less than 15 [N/m] and not more than 40 [N/m].

DETAILED DESCRIPTION (1. Overall Configuration of Image Forming Apparatus 1)

Figure 1:
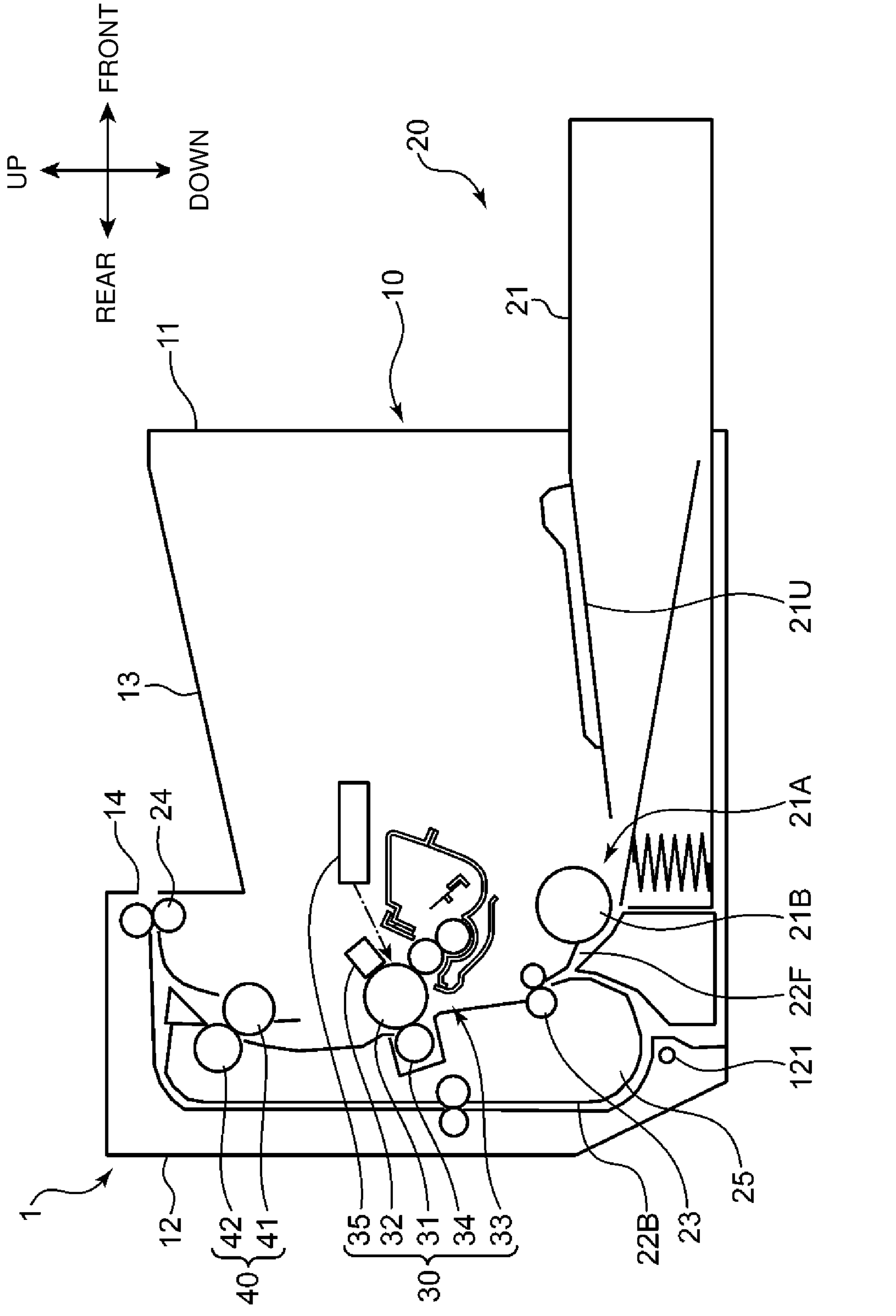
FIG. 1 is a sectional side view showing a schematic configuration of an image forming apparatus in which a developing portion of the present disclosure is mounted.

With reference to the appended drawings, the following describes an embodiment of the present disclosure. FIG. 1 is a sectional side view showing a schematic configuration of an image forming apparatus 1 according to the embodiment of the present disclosure. In FIG. 1, a right side corresponds to a front side of the image forming apparatus 1, and a left side corresponds to a rear side thereof.

The image forming apparatus 1 (herein, a monochrome printer) includes, in addition to a main body housing 10 having a housing structure substantially in a rectangular parallelepiped shape, a paper feed section 20, an image forming section 30, and a fixing portion 40, which are housed in the main body housing 10. The main body housing 10 includes a front cover 11 provided on a front surface side thereof and a rear cover 12 provided on a rear surface side thereof. When the rear cover 12 is opened, a unit of the image forming section 30 can be inserted in or taken out of the main body housing 10 from the rear surface side thereof. Furthermore, on an upper surface of the main body housing 10, there is provided a paper discharge portion 13 to which a sheet after being subjected to image formation is discharged. In the following description, a term "sheet" refers to a copy sheet, a sheet of coated paper, an OHP sheet, a sheet of cardboard, a postcard, a sheet of tracing paper, or any other sheet material to be subjected to image forming processing.

The paper feed section 20 includes a paper feed cassette 21 for housing sheets to be subjected to image forming processing. The paper feed cassette 21 has a part protruding forward beyond a front surface of the main body housing 10. An upper surface of a part of the paper feed cassette 21 housed in the main body housing 10 is covered with a paper feed cassette top plate 21U. The paper feed cassette 21 is provided with a sheet housing space for housing a bundle of sheets, a lift plate with which the bundle of sheets is lifted so as to be fed, and so on. A sheet feed-out portion 21A is provided above a rear end part of the paper feed cassette 21. In the sheet feed-out portion 21A, there is disposed a paper feed roller 21B for feeding out a topmost sheet one by one from the bundle of sheets in the paper feed cassette 21.

The image forming section 30 performs an image forming operation in which a toner image (a developer image) is formed on a sheet sent out from the paper feed section 20. The image forming section 30 includes, in addition to a photosensitive drum 31, a charging portion 32, an exposure portion 35, a developing portion 33, and a transfer roller 34, which are disposed around the photosensitive drum 31.

The photosensitive drum 31 (an image carrying member) includes a rotary shaft and an outer circumferential surface (a drum main body) that rotates about the rotary shaft. The photosensitive drum 31 is formed of, for example, a known organic photoconductor (OPC), and a photosensitive layer composed of an electric charge generation layer, an electric charge transport layer, and so on is formed on the outer circumferential surface thereof. After the photosensitive layer is uniformly charged by the after-mentioned charging portion 32, light is applied thereto by the exposure portion 35 so that an electrostatic latent image with attenuated electrostatic charge is formed thereon, and by the developing portion 33, the electrostatic latent image is visualized into a toner image, which is thus carried on the photosensitive layer.

Figure 2:
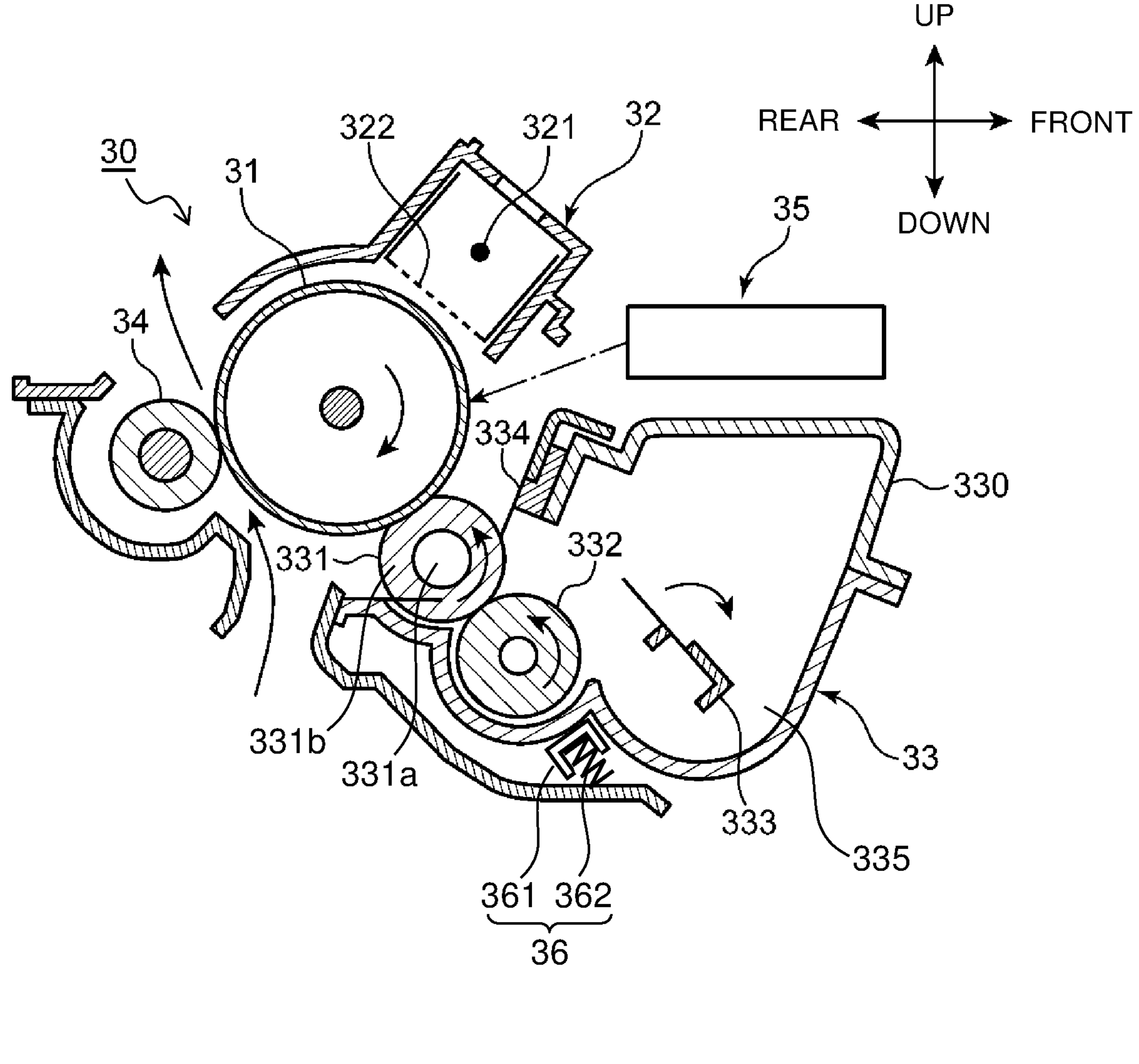
FIG. 2 is a sectional side view showing a schematic configuration of an image forming section including a developing portion according to an embodiment of the present disclosure.

The charging portion 32 (a charging device) is disposed at a prescribed distance from the outer circumferential surface of the photosensitive drum 31 and uniformly charges the outer circumferential surface of the photosensitive drum 31 without contacting it. Specifically, the charging portion 32 includes a charge wire 321 and a grid electrode 322 (both are shown in FIG. 2). The charge wire 321 is a linear electrode extending in a rotation axis direction of the photosensitive drum 31 and generates corona discharge between itself and the photosensitive drum 31. The grid electrode 322 is a grid-shaped electrode extending in the rotation axis direction of the photosensitive drum 31 and is placed between the charge wire 321 and the photosensitive drum 31. In the charging portion 32, a current having a prescribed current value is passed through the charge wire 321 so that corona discharge is generated, and a prescribed voltage is applied to the grid electrode 322, and thus the outer circumferential surface of the photosensitive drum 31 opposed to the grid electrode 322 is uniformly charged to a prescribed surface potential.

The exposure portion 35 (an exposure device) includes a laser light source and optical system instruments such as a mirror and a lens and applies, to the outer circumferential surface of the photosensitive drum 31, light modulated based on image data provided from an external apparatus such as a personal computer. With this configuration, the exposure portion 35 forms, on the outer circumferential surface of the photosensitive drum 31, an electrostatic latent image corresponding to an image based on the image data.

The developing portion 33 (a developing device) is demountably mounted in the main body housing 10 and supplies a toner (a non-magnetic one-component developer) to the outer circumferential surface of the photosensitive drum 31 so as to develop an electrostatic latent image formed on the outer circumferential surface of the photosensitive drum 31. To develop an electrostatic latent image means to visualize the electrostatic latent image into a toner image (a developer image). A detailed configuration of the developing portion 33 will be described later.

The transfer roller 34 is a roller for transferring, onto a sheet, a toner image formed on the outer circumferential surface of the photosensitive drum 31. Specifically, the transfer roller 34 has an outer circumferential surface that axially rotates and is opposed to the outer circumferential surface of the photosensitive drum 31 at a position on a downstream side relative to a developing roller 331 in a rotation direction of the photosensitive drum 31. The transfer roller 34 transfers the toner image carried on the outer circumferential surface of the photosensitive drum 31 to a sheet passing through a nip between itself and the outer circumferential surface of the photosensitive drum 31. During this transfer, a transfer voltage having a polarity opposite to that of the toner is applied to the transfer roller 34.

The fixing portion 40 performs fixing processing in which a toner image transferred to a sheet is fixed on the sheet. The fixing portion 40 includes a fixing roller 41 and a pressing roller 42. The fixing roller 41 includes therein a heating source and heats the toner transferred to the sheet at a prescribed temperature. The pressing roller 42 is brought into pressure contact with the fixing roller 41, thus forming a fixing nip between itself and the fixing roller 41. When the sheet to which the toner image has been transferred is passed through the fixing nip, the toner image is fixed on the sheet under heat applied by the fixing roller 41 and a pressure applied by the pressing roller 42.

In the main body housing 10, there are provided a main conveyance path 22F and an inversion conveyance path 22B, which are used for sheet conveyance. The main conveyance path 22F extends from the sheet feed-out portion 21A in the paper feed section 20 to a paper discharge port 14 provided to be opposed to the paper discharge portion 13 on the upper surface of the main body housing 10 via the image forming section 30 and the fixing portion 40. The inversion conveyance path 22B is a conveyance path used in duplex printing on a sheet, along which the sheet with one side thereof having been subjected to printing is conveyed back to an upstream side of the image forming section 30 in the main conveyance path 22F.

The main conveyance path 22F is provided to extend so as to pass upward from below through a transfer nip formed by the photosensitive drum 31 and the transfer roller 34. Furthermore, a registration roller pair 23 is disposed on an upstream side relative to the transfer nip in the main conveyance path 22F. At the registration roller pair 23, conveyance of a sheet is once stopped so that the sheet is subjected to skew correction, and then the sheet is sent out to the transfer nip at a prescribed timing for image transfer. At suitable locations in the main conveyance path 22F and the inversion conveyance path 22B, there is disposed a plurality of conveyance rollers used for sheet conveyance. A paper discharge roller pair 24 is disposed in a neighborhood of the paper discharge port 14.

The inversion conveyance path 22B is formed between an outside surface of an inversion unit 25 and an inner surface of the rear cover 12 of the main body housing 10. The transfer roller 34 and one of rollers constituting the registration roller pair 23 are mounted on an inside surface of the inversion unit 25. The rear cover 12 and the inversion unit 25 are each axially pivotable about a supporting point 121 provided at a lower end thereof. Upon occurrence of a jam (a paper jam) in the inversion conveyance path 22B, the rear cover 12 is opened. Upon occurrence of a jam in the main conveyance path 22F or in a case where a unit of the photosensitive drum 31 or the developing portion 33 is taken outside, not only the rear cover 12 but also the inversion unit 25 is opened.

(2. Configuration of Image Forming Section)

Figure 3:
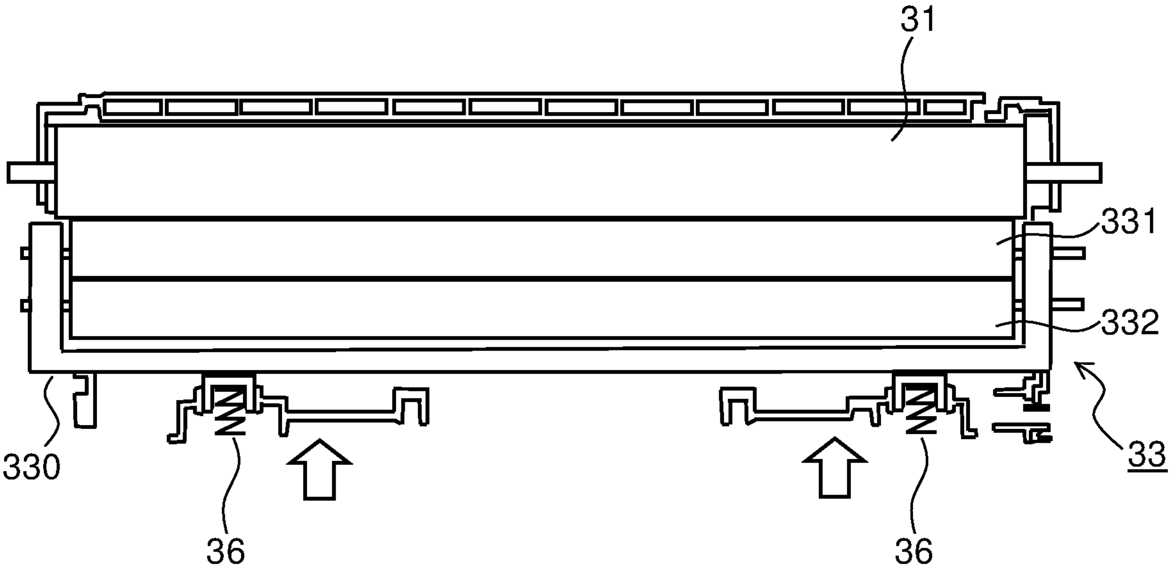
FIG. 3 is a plan view, as seen from above, of a vicinity of a contact part between a photosensitive drum and a developing roller of the developing portion.
Figure 4:
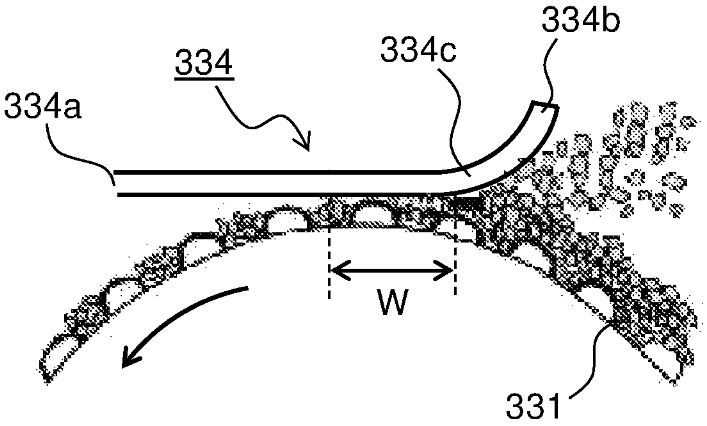
FIG. 4 is an enlarged sectional view of a vicinity of a contact part between the developing roller and a regulation blade in the developing portion.
Figure 5:
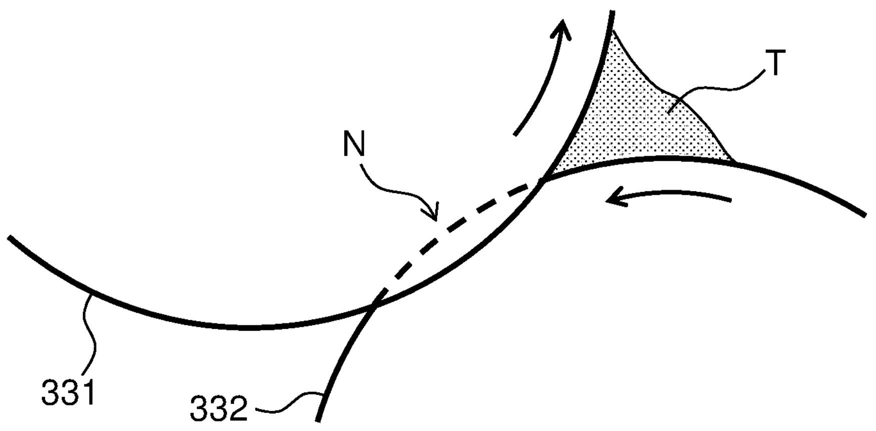
FIG. 5 is an enlarged sectional view of an abutment part between the developing roller and a supply roller.

FIG. 2 is a sectional view of the image forming section 30 in the image forming apparatus 1 of the present embodiment. FIG. 3 is a plan view, as seen from above, of a vicinity of a contact part between the photosensitive drum 31 and the developing roller 331 of the developing portion 33. FIG. 4 is an enlarged sectional view of a vicinity of a contact part between the developing roller 331 and a regulation blade 334 in the developing portion 33. FIG. 5 is an enlarged sectional view of an abutment part between the developing roller 331 and a supply roller 332.

As shown in FIG. 2 and FIG. 3, the developing portion 33 includes a development housing 330 (a development container), the developing roller 331 (a developer carrying member), the supply roller 332, an agitation paddle 333, and the regulation blade 334.

The development housing 330 contains therein a non-magnetic one-component developer composed only of a toner and houses the developing roller 331, the supply roller 332, the regulation blade 334, and so on. The development housing 330 includes an agitation chamber 335 for containing the developer (the toner) in an agitated state. The agitation paddle 333 is disposed in the agitation chamber 335. The agitation paddle 333 is used to agitate the toner in the agitation chamber 335.

The developing roller 331 includes a rotary shaft 331*a* and a roller portion 331*b*. The rotary shaft 331*a* is rotatably supported to bearings (not shown) provided in the development housing 330. The roller portion 331*b* is a cylindrical member stacked on an outer circumferential surface of the rotary shaft 331*a* and is configured by stacking, on a surface of a base rubber (for example, a silicone rubber), a coat layer formed of a coating material having asperities such as urethane. The roller portion 331*b* rotates integrally with the rotary shaft 331*a* as the rotary shaft 331*a* rotates. A toner layer (a developer layer) having a prescribed thickness is formed on a surface of the roller portion 331*b*. A thickness of the toner layer is regulated (uniformly adjusted to a prescribed thickness) by the after-mentioned regulation blade 334. The toner layer becomes charged with static electricity generated by abutment (friction) between the regulation blade 334 and the roller portion 331*b*.

At a position opposed to the photosensitive drum 31, the developing roller 331 rotates in a direction (a counterclockwise direction in FIG. 2) directed from an upstream side to a downstream side in the rotation direction of the photosensitive drum 31 (a clockwise direction in FIG. 2). That is, at the position opposed to the photosensitive drum 31, the developing roller 331 rotates in the same direction as the rotation direction of the photosensitive drum 31.

The supply roller 332 is disposed to be opposed to the developing roller 331. The supply roller 332 retains, on an outer circumferential surface thereof, the developer contained in the agitation chamber 335. Furthermore, the supply roller 332 supplies the developer retained on the outer circumferential surface thereof to the developing roller 331.

At a position opposed to the developing roller 331, the supply roller 332 rotates in a direction (the counterclockwise direction in FIG. 2) directed from a downstream side to an upstream side in the rotation direction of the developing roller 331 (the counterclockwise direction in FIG. 2). That is, at the position opposed to the developing roller 331, the supply roller 332 rotates in an opposite direction to the rotation direction of the developing roller 331. In order to cause the toner to move from the supply roller 332 to the developing roller 331, a prescribed supply voltage (a direct-current voltage) is applied to the supply roller 332.

The developing roller 331 is supplied with the developer from the supply roller 332 and retains the toner layer on an outer circumferential surface thereof. Further, the developing roller 331 supplies the developer to the photosensitive drum 31. The developing roller 331 and the supply roller 332 each have a length in an axial direction thereof (a direction orthogonal to a drawing plane of FIG. 2) substantially equal to a length of the photosensitive drum 31 in an axial direction thereof. In order to cause the toner to move from the developing roller 331 to the photosensitive drum 31, a prescribed development voltage (a direct-current voltage) is applied to the developing roller 331.

In the image forming section 30, a pressing mechanism 36 composed of a pressing member 361 and a pressing spring 362 is disposed on an opposite side to the photosensitive drum 31 via the development housing 330 (a lower right side in FIG. 2, a lower side in FIG. 3). The pressing mechanism 36 is disposed at each of two locations on the development housing 330 along a longitudinal direction thereof (at positions 85 mm away from a center of the photosensitive drum 31 in the axial direction). When the developing portion 33 is mounted in the image forming section 30, the development housing 330 is brought into pressure contact with the pressing member 361 and thus is pressed in a direction toward the photosensitive drum 31 (an upper left direction in FIG. 2, an upper direction in FIG. 3), so that the developing roller 331 is pressed at a prescribed pressing force to the photosensitive drum 31. In the present embodiment, the developing portion 33 and the photosensitive drum 31 have no mechanism for regulating a distance between the developing roller 331 and the photosensitive drum 31, namely, no mechanism for regulating a pressing force of the developing roller 331 with respect to the photosensitive drum 31. There, however, may be provided such a mechanism for regulating the pressing force of the developing roller 331 with respect to the photosensitive drum 31.

The regulation blade 334 is a thin plate-shaped member made of metal. The regulation blade 334 is configured so that a proximal end 334*a* thereof is secured to the development housing 330 and a distal end 334*b* thereof is a free end. At a position on an upstream side relative to a position at which the photosensitive drum 31 is opposed to the developing roller 331 in the rotation direction of the developing roller 331, the regulation blade 334 contacts the outer circumferential surface of the developing roller 331.

The regulation blade 334 is flexibly deformable, and there is a contact part (a regulation nip) between the reregulate blade 334 and the developing roller 331 in a circumferential direction of the developing roller 331. The regulation blade 334 abuts on the outer circumferential surface of the developing roller 331 (the roller portion 331*b*) at a prescribed regulation pressure and with a prescribed regulation nip width W. As will be described later, a configuration may be adopted in which a prescribed regulation voltage (a direct-current voltage) is applied to the regulation blade 334.

The regulation blade 334 is made of, for example, stainless steel (SUS304) and has a free length of 10 mm in the present embodiment. The distal end 334*b* of the regulation blade 334 is bent so that a curved part 334*c* is formed. The curved part 334*c* abuts on the outer circumferential surface of the developing roller 331. The curved part 334*c* has a radius of curvature of not less than 0.1 mm.

As shown in FIG. 4, the regulation blade 334 abuts on the developing roller 331 at a constant regulation pressure (contact linear pressure), and thus the toner layer carried on the outer circumferential surface of the developing roller 331 is adjusted to be uniform in thickness. With this configuration, the regulation blade 334 regulates an amount of the toner on the outer circumferential surface of the developing roller 331. Furthermore, the regulation blade 334 rubs against the toner carried on the outer circumferential surface of the developing roller 331 and thus charges the toner. The contact linear pressure of the regulation blade 334 with respect to the developing roller 331 refers to a contact pressure per unit length of the regulation blade 334 at a contact position between the regulation blade 334 and the outer circumferential surface of the developing roller 331.

As shown in FIG. 5, the abutment part (a supply nip N) between the developing roller 331 and the supply roller 332 has a configuration in which the developing roller 331 bites into the supply roller 332. Furthermore, a toner pool T is formed on a downstream side (an upper right side in FIG. 5) of the supply nip N in the rotation direction of the developing roller 331.

It is known that when the developing roller 331 and the supply roller 332 are in linear contact with each other at the supply nip N, the toner pool T is not formed, which results in a significant decrease in toner supply property. To avoid this, it is required that an inter-shaft distance between the developing roller 331 and the supply roller 332 and respective diameters and hardnesses thereof be designed so that an amount of biting of the developing roller 331 into the supply roller 332 is appropriate. The developing roller 331 contacts the photosensitive drum 31, which is a hard member, and thus is designed to have an Asker C hardness of about 50 to 80. In order, therefore, to achieve the configuration in which the developing roller 331 bites into the supply roller 332, it is required that the supply roller 332 have a hardness lower than that of the developing roller 331.

When a potential difference is generated between the supply roller 332 and the developing roller 331, there is generated electric field energy in such a direction as to cause the toner to move from the supply roller 332 to the developing roller 331. Furthermore, a van der Waals force acts between toner particles regardless of the potential difference. By the electric field energy and the van der Waals force, the toner is supplied from the supply roller 332 to the developing roller 331. In order to improve density followability of a solid image (a capability to achieve no density difference between a leading edge and a trailing edge of the image), it is also important that a compression load with which the supply roller 332 is pressed to the developing roller 331 be set to be in an optimum range.

(3. Control Paths of Image Forming Apparatus 1)

Figure 6:
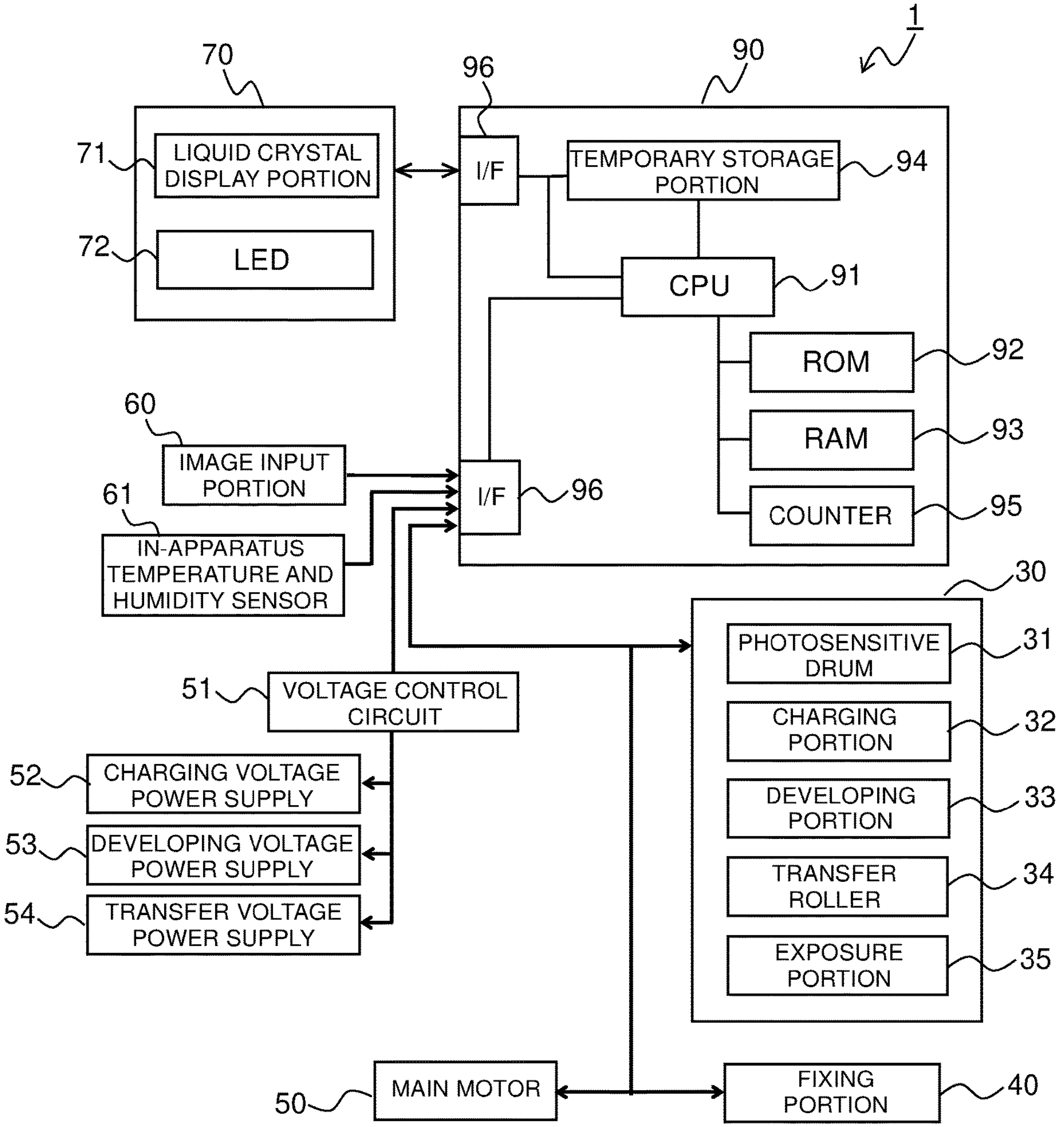
FIG. 6 is a block diagram showing an example of control paths used in the image forming apparatus.

FIG. 6 is a block diagram showing an example of control paths used in the image forming apparatus 1 of the present embodiment. In using the image forming apparatus 1, the various portions therein are controlled in different ways, and thus the image forming apparatus 1 as a whole has complicated control paths. Thus, herein, a description of the control paths is made with emphasis on some of the control paths required for implementing the present disclosure.

Based on output signals from a control section 90, a main motor 50 drives to rotate, in addition to the paper feed roller 21B and the photosensitive drum 31, the developing roller 331, the supply roller 332, and the agitation paddle 333 in the developing portion 33, the fixing roller 41 in the fixing portion 40, and so on at prescribed respective rotation speeds.

A voltage control circuit 51 is connected to a charging voltage power supply 52, a development voltage power supply 53, and a transfer voltage power supply 54 and, based on output signals from the control section 90, operates these power supplies. Based on a control signal from the voltage control circuit 51, the charging voltage power supply 52 applies a charging voltage to the charge wire 321 in the charging portion 32. The development voltage power supply 53 applies a development voltage to the developing roller 331 and a supply voltage to the supply roller 332 in the developing portion 33. In a case of applying a regulation voltage to the regulation blade 334 in the developing portion 33, the development voltage power supply 53 applies the regulation voltage to the regulation blade 344. The transfer voltage power supply 54 applies a transfer voltage to the transfer roller 34.

An image input portion 60 is a reception portion that receives image data transmitted from a personal computer or the like to the image forming apparatus 1. An image signal inputted from the image input portion 60 is converted into a digital signal, which then is sent out to a temporary storage portion 94.

An in-apparatus temperature and humidity sensor 61 detects a temperature and a humidity inside the image forming apparatus 1, particularly a temperature and a humidity in a vicinity of the developing portion 33, and is disposed in a neighborhood of the image forming section 30.

An operation section 70 is provided with a liquid crystal display portion 71 and an LED 72 that indicates various states and thus functions to indicate a status of the image forming apparatus 1 and to display an image forming situation and the number of printed copies. Various settings for the mage forming apparatus 1 are made via a printer driver of a personal computer.

The control section 90 includes at least a CPU (central processing unit) 91 as a central computation processor, a ROM (read-only memory) 92 that is a read-only storage portion, a RAM (random-access memory) 93 that is a readable and writable storage portion, the temporary storage portion 94 that temporarily stores image data and so on, a counter 95, and a plurality of (herein, two) I/Fs (interfaces) 96 that transmits control signals to the various devices in the image forming apparatus 1 and receives input signals from the operation section 70.

The ROM 92 contains, for example, data not to be changed during use of the image forming apparatus 1, such as control programs for the image forming apparatus 1 and numerical values required for control. The RAM 93 stores, for example, data necessitated when control of the image forming apparatus 1 is in progress and data temporarily required for controlling the image forming apparatus 1.

The temporary storage portion 94 temporarily stores an image signal inputted from the image input portion 60, which receives image data transmitted from a personal computer or the like, and converted into a digital signal. The counter 95 cumulatively counts the number of printed sheets.

Furthermore, the control section 90 transmits control signals from the CPU 91 to the various portions and devices in the image forming apparatus 1 via the I/Fs 96. Furthermore, from the various portions and devices, signals indicating respective statuses thereof and input signals are transmitted to the CPU 91 via the I/Fs 96. Examples of the various portions and devices controlled by the control section 90 include the image forming section 30, the fixing portion 40, the main motor 50, the voltage control circuit 51, the image input portion 60, and the operation section 70.

(4. Settings of Surface Roughness of Developing Roller and Contact Linear Pressure of Regulation Blade in Developing Portion)

The following describes settings of a surface roughness of the developing roller 331 and the contact linear pressure of the regulation blade 334 in the developing portion 33, which characterize the image forming apparatus 1 of the present embodiment. In the present embodiment, a ratio Rz1/Rz2 between a ten-point average roughness Rz1 in a circumferential direction and a ten-point average roughness Rz2 in an axial direction (a ratio between a circumferential roughness and an axial roughness) of the roller portion **331*b* of the developing roller 331** is set to satisfy Rz1/Rz2≤1.5. A ten-point average roughness Rz described herein is stipulated in the Japanese Industrial Standards (JIS B0601: 1944).

Methods for manufacturing the developing roller 331 are roughly categorized into a polishing method and a non-polishing method. In the polishing method, a base rubber (in the present embodiment, a silicone rubber) forming the roller portion **331*b* is polished by a polishing machine so that an outer diameter thereof is adjusted. In the polishing method, the roller portion 331*b* of the developing roller 331, which rotates about the rotary shaft 331*a*, is contacted by a grindstone so that an outer circumferential surface of the roller portion 331*b* is polished. This results in formation of ripple-shaped polishing marks on the roller portion 331*b* in the circumferential direction, thus causing the roller portion 331*b* to vary in surface roughness between in the circumferential direction and in the axial direction. Specifically, the roller portion 331*b*** has a larger surface roughness in the circumferential direction (ten-point average roughness Rz1).

The polishing marks on the roller portion **331*b* in the circumferential direction can be reduced limitlessly (approximated to zero) by decreasing a speed for polishing the roller portion 331*b* or by repolishing, using a finer-grit polishing machine, the roller portion 331*b* that has been polished once. That is, a case where Rz1/Rz2=1.0 corresponds to a state where there are almost zero polishing marks in the circumferential direction (the same state as in the axial direction). Furthermore, a case where Rz1/Rz2=1.5 corresponds to a state where there remain polishing marks in the circumferential direction, and thus Rz1 is larger than Rz2. In the state where there remain polishing marks in the circumferential direction, i.e., a state where microscopic asperities are largely present in the circumferential direction, it becomes likely that the toner is caught particularly between convex parts of the asperities and the regulation blade 334. Conceivably, as a result of this, a strong frictional force is applied to the toner, which then becomes likely to deteriorate, and toner melt adhesion to the regulation blade 334** also becomes likely to occur.

In short, conceivably, the more the polishing marks on the roller portion **331*b* in the circumferential direction are reduced, the more an effect of suppressing toner melt adhesion by reducing the contact linear pressure of the regulation blade 334 is improved. In order, however, to reduce the polishing marks on the roller portion 331, it is required to decrease the polishing speed or to perform repolishing, resulting in an increase in processing time. Reducing the polishing marks on the roller portion 331, therefore, has a contradictory relationship (a tradeoff) with a manufacturing cost of the developing roller 331**.

As shown by after-mentioned test results, it has been confirmed that when Rz1/Rz2 is not more than 1.5, toner melt adhesion is drastically suppressed to prolong a life of the developing portion 33. Since Rz1/Rz2=1.0 corresponds to the state where there are no polishing marks in the circumferential direction as described above, in no case does the developing roller 331 manufactured by the polishing method satisfy Rz1/Rz2<1.0. In order to effectively reduce toner melt adhesion, preferably, Rz1/Rz2≤1.5 is satisfied, and more preferably, Rz1/Rz2=1.0 is satisfied.

In a case where Rz2 is large, in order to satisfy Rz1/Rz2≤1.5, Rz1 is adjusted to be increased in proportion to Rz2. In a case, however, where Rz1 and Rz2 are both large, the number of toner particles caught between the convex parts of the asperities and the regulation blade 334 is increased, and thus a frictional force applied to the toner is distributed to decrease an amount of the frictional force applied to each of the toner particles. For this reason, even when Rz2 is large, as long as Rz1 is adjusted to satisfy Rz1/Rz2≤1.5, there is no possibility that toner melt adhesion deteriorates.

While, as described above, there is no particular limitation on a magnitude of Rz2 of the roller portion 331*b* from the standpoint of toner melt adhesion, when Rz2 is too small, an amount of the toner conveyed (= an amount of the toner transferred onto a sheet surface) by the roller portion 331*b* is decreased to lower an image density. When, on the other hand, Rz2 is too large, the amount of the toner conveyed by the roller portion 331*b* is excessively increased to decrease a toner charge amount, so that image fogging becomes likely to occur. Furthermore, since the amount of the toner transferred onto a sheet surface is also increased, there occur troubles such as an increase in toner consumption and occurrence of a fixing failure. For this reason, Rz2 is in a range of preferably 2 to 20 μm, more preferably 3 to 15 μm and even more preferably 4 to 10 μm.

In adjusting Rz1 and Rz2 of the roller portion 331*b*, a desired surface roughness may be obtained merely by polishing or by stacking a particle-containing coat layer on the roller portion 331*b* that has been polished.

Furthermore, the larger the contact linear pressure of the regulation blade 334, the more toner deterioration is accelerated, in which case toner sticking to the regulation blade 334 becomes likely to occur. When, on the other hand, the contact linear pressure of the regulation blade 334 is too small, the toner layer carried on the outer circumferential surface of the developing roller 331 can no longer be regulated, and thus an amount of the toner on the developing roller 331 is drastically increased. In the present embodiment, the contact linear pressure of the regulation blade 334 is set to not less than 15 [N/m] and not more than 40 [N/m], so that toner deterioration is suppressed to a minimum, and the amount of the toner on the developing roller 331 is maintained constant.

(5. Setting of Contact Area Ratio of Developing Roller of Developing Portion)

In order to further prolong the life of the developing portion 33 (in order for a cumulative number of sheets printed until toner melt adhesion occurs to reach 3,000 sheets), an adjustment is performed using a surface profile (the surface roughness) of the developing roller 331 as a new parameter.

Figure 7:
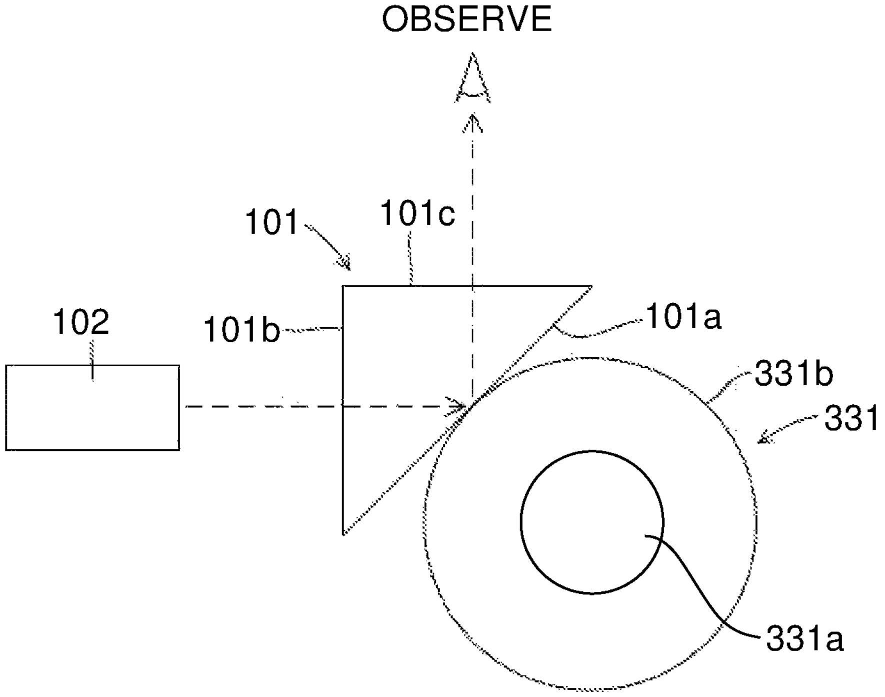
FIG. 7 is a view schematically showing a method for measuring a surface profile of a roller portion.

FIG. 7 is a view schematically showing a method (a measuring instrument) for measuring a surface profile of the roller portion 331*b*. As shown in FIG. 7, the measuring instrument for measuring the surface profile of the roller portion 331*b* of the developing roller 331 includes, as constituent elements thereof, a prism 101 (a transparent member) and a light source 102.

The prism 101 is made of glass and is a triangular prism having three mutually non-parallel planes. As viewed sideways, the prism 101 has a shape of an isosceles triangle. Specifically, as viewed sideways, the prism 101 has a shape of an isosceles right triangle. A transparent member other than the prism 100 may be used to measure the surface profile of the roller portion 331*b*.

In measuring the surface profile of the roller portion 331*b*, any one of the three mutually non-parallel planes of the prism 101 as a pressing surface 101*a* is pressed against the outer circumferential surface of the roller portion 331*b*. In the present embodiment, one of the three mutually non-parallel planes of the prism 101 interposed between two mutually perpendicular planes of the prims 101 as viewed sideways is used as the pressing surface 101*a*.

The light source 102 makes white light incident on a light incidence surface 101*b* that is one of the three mutually non-parallel planes of the prism 101 other than the pressing surface 101*a*. As the light source 102, an LED, a semiconductor laser, and so on may be used. In the present embodiment, one (a perpendicular plane in FIG. 7) of the two mutually perpendicular planes of the prism 101 as viewed sideways is used as the light incidence surface 101*b*. Furthermore, in FIG. 7, light emitted from the light source 102 and travelling through the prism 101 is indicated by broken-line arrows.

In a measurement of the surface profile of the roller portion 331*b*, through an observation surface 101*c* that is one of the three mutually non-parallel planes of the prism 101 other than the pressing surface 101*a* and the light incidence surface 101*b*, there is observed a contact state between the outer circumferential surface of the roller portion 331*b* and the pressing surface 101*a* of the prism 101 when light is made incident on the light incidence surface 101*b*. In the present embodiment, one (a horizontal plane in FIG. 7) of the two mutually perpendicular planes as viewed sideways other than the light incidence surface 101*b* is used as the observation surface 101*c*.

In order to reproduce a state where the regulation blade 334 is in contact with the outer circumferential surface of the roller portion 331*b*, the pressing surface 101*a* of the prism 101 is pressed against the outer circumferential surface of the roller portion 331*b*. Furthermore, the roller portion 331*b* has microscopic asperities provided on the outer circumferential surface thereof. That is, the developing roller 331 has concave parts and convex parts provided on the outer circumferential surface thereof. It is, therefore, not that the pressing surface 101*a* of the prism 101 makes contact in an entire region (100% of an area) thereof with the outer circumferential surface of the roller portion 331*b*.

On the pressing surface 101*a* of the prism 101, regions (hereinafter, referred to as convex regions) opposed to the convex parts contact the outer circumferential surface of the roller portion 331*b*, and regions (hereinafter, referred to as concave regions) opposed to the concave parts do not contact the outer circumferential surface of the roller portion 331*b*. Clearance spaces (voids) are generated between the outer circumferential surface of the roller portion 331*b* and the concave regions on the pressing surface 101*a* of the prism 101.

With this configuration, on the pressing surface 101*a* of the prism 101, there occurs a difference in intensity of light depending on whether the light is incident on the concave regions or on the convex regions. In the concave regions on the pressing surface 101*a* of the prism 101, white light from the light source 102 is totally reflected. Meanwhile, in the convex regions on the pressing surface 101*a* of the prism 101, no clearance spaces are generated. Thus, in the convex regions on the pressing surface 101*a* of the prism 101, white light from the light source 102 is diffusely reflected or absorbed, so that an intensity of the light is decreased compared with that in the concave regions.

Figure 8:
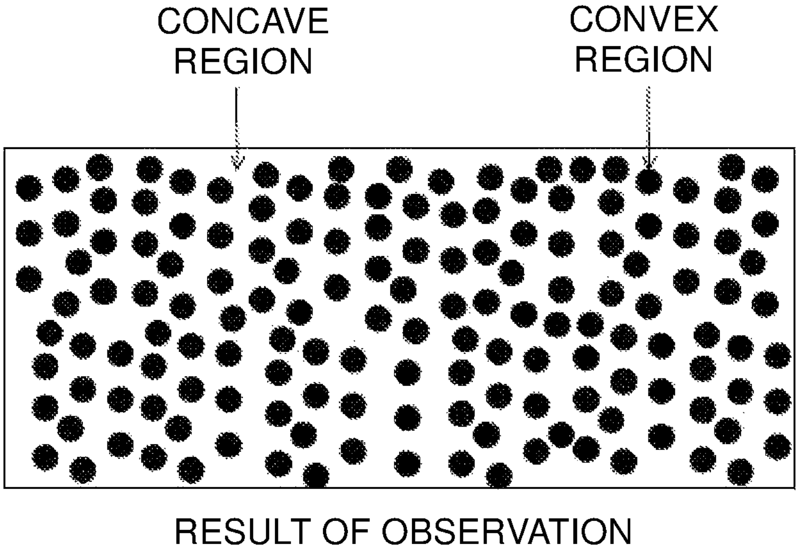
FIG. 8 is a view schematically showing a result of observing, by using a microscope, an observation surface of a prism in a state shown in FIG. 7.

FIG. 8 is a view schematically showing a result of observing, by using a microscope, the observation surface 101*c* of the prism 101 in a state shown in FIG. 7. By observing the observation surface 101*c* of the prism 101, as shown in FIG. 8, it is possible to detect a contrast of reflection light (dark regions and bright regions) on the pressing surface 101*a*. The convex regions (regions on the pressing surface 101*a* of the prism 101, which are actually in contact with the outer circumferential surface of the developing roller 331) manifest themselves as the dark regions. That is, the convex regions can be detected. In FIG. 8, the dark regions are indicated by solid black circles.

In the measurement of the surface profile of the roller portion 331*b*, the pressing surface 101*a* of the prism 101 is pressed at a linear pressure of 50 [N/m] against the outer circumferential surface of the roller portion 331*b*. The regulation blade 334 makes contact at a linear pressure of not less than 20 N/m and not more than 60 N/m with the outer circumferential surface of the developing roller 331. In order, therefore, to reproduce the state where the regulation blade 334 is in contact with the outer circumferential surface of the roller portion 331*b*, a linear pressure at which the pressing surface 101*a* of the prism 101 is pressed against the outer circumferential surface of the roller portion 331*b* is set to not less than 20 [N/m] and not more than 60 [N/m].

Further, there is determined a ratio of an actual contact area to an area of a nip between the pressing surface 101*a* of the prism 101 and the outer circumferential surface of the roller portion 331*b* when contacted thereby at a linear pressure of 50 [N/m]. The area of the nip is a product of a nip width and a nip length. The nip width described herein refers to a contact width between the outer circumferential surface of the roller portion 331*b* and the pressing surface 101*a* of the prism 101 in the circumferential direction of the developing roller 331. The nip length refers to a contact length between the outer circumferential surface of the roller portion 331*b* and the pressing surface 101*a* of the prism 101 in a rotation axis direction of the developing roller 331.

Furthermore, the actual contact area refers to an area of actual contact between the outer circumferential surface of the roller portion 331*b* and the pressing surface 101*a* of the prism 101. That is, the actual contact area refers to a total area of the convex regions on the pressing surface 101*a* of the prism 101. Herein, the ratio of the actual contact area to the area of the nip between the pressing surface 101*a* of the prism 101 and the outer circumferential surface of the roller portion 331*b* when contacted thereby at a linear pressure of 50 [N/m] is used as a contact area ratio.

By observing the observation surface 101*c* of the prism 101, it is possible to detect regions on the pressing surface 101*a* of the prism 101, which are actually in contact with the outer circumferential surface of the roller portion 331*b*. It is also possible to determine a total area of the regions thus detected. That is, by observing the observation surface 101*c* of the prism 101, it is possible to determine the after-mentioned contact area ratio. Specifically, binarization processing of a photographed image is performed based on a set threshold value of luminance information on the photographed image, and there is calculated a ratio of an area occupied by black regions to an entire area of the image after being subjected to the binarization processing (=a total area of the black regions/the area of the image after being subjected to the binarization processing). In this manner, the contact area ratio can be determined in numerical terms.

The smaller the contact area ratio, the more clearance spaces between the developing roller 331 and each of the photosensitive drum 31 and the regulation blade 334 are increased. As a result, physical stress applied to the toner is reduced, and thus it is possible to suppress toner melt adhesion to the regulation blade 334. As shown by the after-mentioned test results, when the contact area ratio is not more than 20%, toner melt adhesion to the regulation blade 334 and resulting occurrence of thin layer streaks in a thin toner layer on the developing roller 331 are suppressed to prolong the life of the developing portion 33.

When, however, the contact area ratio is not more than 5%, thickness unevenness of the thin toner layer on the developing roller 331 is increased to cause image unevenness. For this reason, preferably, the contact area ratio is in a range of not less than 5% and not more than 20%. The contact area ratio can be adjusted by adjusting a particle size of a roughening agent (particulates of silicone, urethane, or the like) contained in a surface layer (the coat layer) of the roller portion 331*b* or an additive amount of the roughening agent.

(6. Setting of Electrostatic Capacity of Developing Roller of Developing Portion)

In order to further prolong the life of the developing portion 33, an adjustment is performed using an electrostatic capacity of the developing roller 331 as a new parameter.

The amount of the toner conveyed can be controlled by adjusting an electrostatic capacity of the roller portion 331*b* of the developing roller 331. Specifically, when the electrostatic capacity of the developing roller 331 is increased, an electric adhesion force (an image force) between the developing roller 331 and the toner is increased. This makes it possible, without extremely increasing the surface roughness of the developing roller 331, to increase an amount of the toner retainable on the developing roller 331.

As shown by the after-mentioned test results, the larger the electrostatic capacity of the roller portion 331*b*, the more the amount of the toner retainable on the developing roller 331 is increased. Furthermore, toner melt adhesion to the regulation blade 334 becomes unlikely to occur. When, however, the electrostatic capacity is excessively increased, the electric adhesion force between the developing roller 331 and the toner becomes too large, and thus the toner can no longer respond to an electric field (a development electric field) between the photosensitive drum 31 and the developing roller 331, so that the image density is decreased.

Preferably, the electrostatic capacity of the roller portion 331*b* is not less than $4.0\times10^{-7}$ [F/m$^2$] and not more than $7.0\times10^{-7}$ [F/m$^2$]. The electrostatic capacity can be adjusted by adjusting an additive amount of an electrically conductive material such as carbon black added to the surface layer (the coat layer) of the roller portion 331*b*.

(7. Evaluation of Images Obtained Under Settings Made to Developing Portion)

The following describes results of an evaluation of images obtained in a case where, as in the present embodiment, there are made settings of the surface roughness of the developing roller 331 and the contact linear pressure of the regulation blade 334 in the developing portion 33. First, an endurance printing test was performed under varying printing conditions (Rz1/Rz2 of the developing roller 331 and the contact linear pressure of the regulation blade 334), and the effect with respect to toner melt adhesion to the regulation blade 334 was examined. The image forming apparatus 1 (manufactured by KYOCERA Document Solutions Inc.) shown in FIG. 1 was used as a test apparatus.

As the developing roller 331, there was used a roller including the rotary shaft 331*a* and the roller portion 331*b* and having an Asker C hardness of 70° and a roller resistance of 7.1 [log Ω]. The rotary shaft 331*a* had a shaft diameter of 6 mm. The roller portion 331*b* included, as a base material layer, a silicone rubber layer having a thickness of 3.5 mm and coated with a urethane coating and had an outer diameter of 13 mm and a length of 232 mm in an axial direction thereof. A constant pressure load instrument (CL-150 manufactured by Kobunshi Keiki Co., Ltd.) was used to measure the Asker C hardness. For a measurement of the roller resistance, the developing roller 331 was rotated in contact with a metal roller, and a direct-current voltage of 100 V was applied thereto.

As for the setting of Rz1/Rz2 of the developing roller 331, the surface roughness of the roller portion 331*b* was adjusted by changing polishing conditions so that Rz1/Rz2=1.0 or 1.5. As the regulation blade 334, a plate-shaped member made of stainless steel (SUS 304) was used, and the contact linear pressure thereof was adjusted to lie between 15 [N/m] and 50 [N/m] by changing a thickness and a free length of the plate-shaped member.

As the photosensitive drum 31, there was used a positively-charged single-layer OPC photosensitive drum (manufactured by KYOCERA Document Solutions Inc.) having an outer diameter of 24 mm and a photosensitive layer thickness of 22 μm.

A toner used was a polyester resin-based toner manufactured by a pulverization method and having a central particle diameter of 8.0 μm and a circularity of 0.96

(Relationship Between Contact Linear Pressure of Regulation Blade and Toner Melt Adhesion)

First, a study was made of a relationship between the contact linear pressure of the regulation blade 334 and toner melt adhesion. In a test method adopted, an image of standard data stipulated in ISO/IEC 19752 (a character pattern with a printing rate of 3.9%) was outputted in an A4 size as a test image. For evaluation of toner melt adhesion to the regulation blade 334, it was visually determined whether or not white streaks had occurred in the outputted test image. The life of the developing portion 33 was determined based on a cumulative number of printed sheets at a time when the toner in the developing portion 33 ran out or a time when characters in the outputted test image broke due to increased occurrence of white streaks in the image, whichever was reached first, and a target value of the cumulative number was set to 1,500 sheets. Results are shown in FIG. 9.

Figure 9:
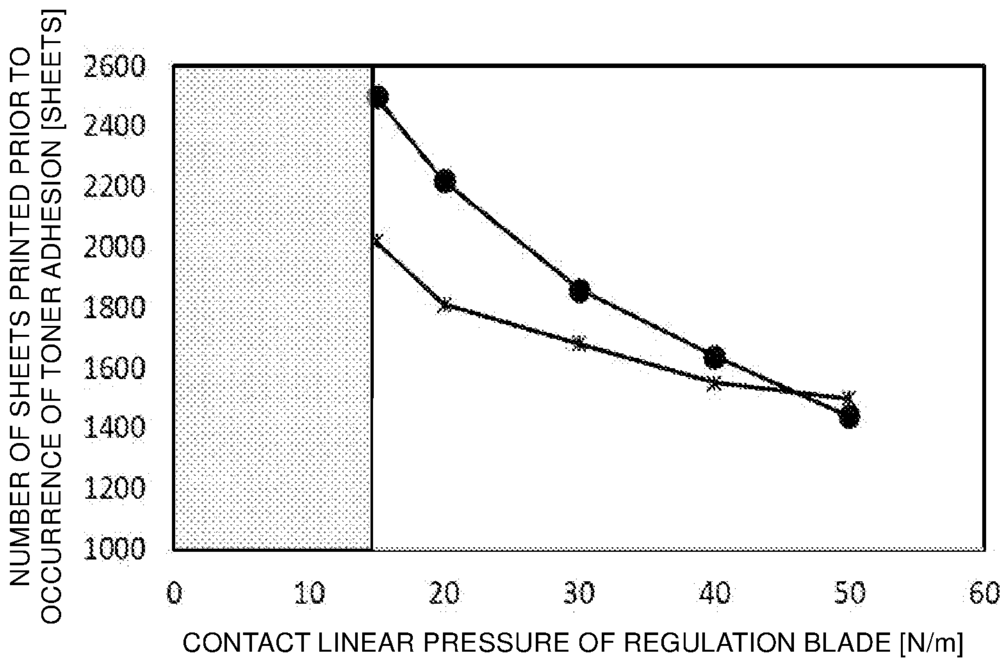
FIG. 9 is a graph showing a relationship between a contact linear pressure of the regulation blade in the developing portion and the number of sheets printed prior to occurrence of toner melt adhesion.

As shown in FIG. 9, in either of a case where Rz1/Rz2 of the developing roller 331 was set to 1.0 (a data series denoted with solid black circles in FIG. 9) and a case where it was set to 1.5 (a data series denoted with asterisks in FIG. 9), the number of sheets printed prior to occurrence of toner melt adhesion (a cumulative number of sheets printed until toner melt adhesion occurs) increased with decreasing contact linear pressure of the regulation blade 334. Conceivably, this is because a decrease in contact linear pressure of the regulation blade 334 leads to a decrease in frictional force applied to the toner in a regulation portion. When, however, the contact linear pressure is smaller than 15 [N/m], it is no longer possible to regulate the toner layer carried on the outer circumferential surface of the developing roller 331, and thus image stability cannot be maintained (a region shaded with dots in FIG. 9). It has thus been confirmed that when the contact linear pressure is not less than 15 [N/m] and not more than 40 [N/m], toner melt adhesion is suppressed, and the image stability can be also maintained.

Furthermore, a comparison between the case where Rz1/Rz2 was set to 1.0 and the case where it was set to 1.5 reveals that the number of sheets printed prior to occurrence of toner melt adhesion was higher in the former case than in the latter case. That is, it has been confirmed that decreasing Rz1/Rz2 further improves an effect of increasing the number of sheets printed prior to occurrence of toner melt adhesion.

(Relationship Between Rz1/Rz2 of Developing Roller and Toner Melt Adhesion)

Next, a study was made of a relationship between Rz1/Rz2 of the developing roller 331 and toner melt adhesion. In a test method adopted, with the contact linear pressure of the regulation blade 334 fixed at 20 [N/m] and Rz2 of the developing roller 331 set to 4.7 μm, Rz1/Rz2 was made to vary in a range of 1.0 to 2.25, and the number of sheets printed prior to occurrence of toner melt adhesion to the regulation blade 334 was checked. For evaluation of occurrence of toner melt adhesion, it was determined whether or not white streaks had occurred in an outputted test image similar to the above-described test image. Results are shown in FIG. 10.

Figure 10:
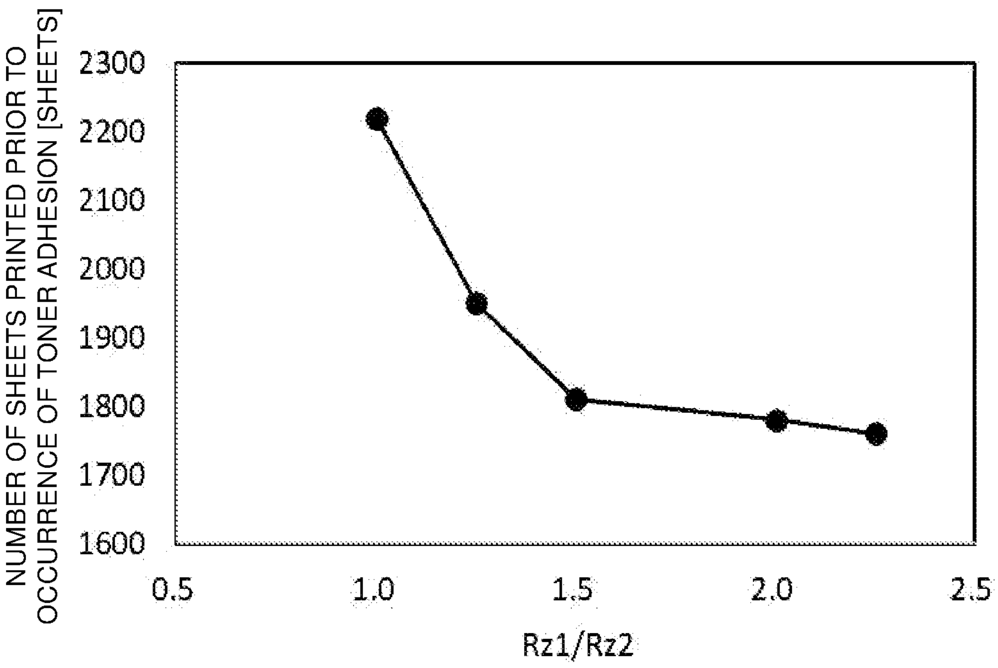
FIG. 10 is a graph showing a relationship between Rz1/Rz2 of the developing roller in the developing portion and the number of sheets printed prior to occurrence of toner melt adhesion.

As shown in FIG. 10, when Rz1/Rz2 of the developing roller 331 was smaller than 1.5, the number of sheets printed prior to occurrence of toner melt adhesion was drastically increased. That is, it has been confirmed that setting Rz1/Rz2 to not more than 1.5, more preferably, to 1.0 further improves the effect of increasing the number of sheets printed prior to occurrence of toner melt adhesion.

(Relationship Between Contact Area Ratio of Developing Roller and Toner Melt Adhesion)

Next, a study was made of a relationship between the contact area ratio of the developing roller 331 and toner melt adhesion. In a test method adopted, an endurance test was carried out (3,000 sheets of test images were continuously printed) in which the contact linear pressure of the regulation blade 334 was made to vary in a range of 15 to 50 [N/m], Rz1/Rz2 of the developing roller 331 was made to vary in a rage of 1.0 to 2.0, and the contact area ratio was made to vary in a range of 5 to 30%, and an image and the thin toner layer on the developing roller 331 at each of an initial stage and a time when a target life was reached (after the printing of 3,000 sheets) were visually checked.

Based on a state resulting from the printing of 3,000 sheets, evaluation criteria were defined as follows. That is, a case where the thin toner layer was uniformly formed on the developing roller 331 and the image was also properly formed with no occurrence of thin layer streaks was indicated as "G (good)," a case where minor occurrence of thin layer streaks in the thin toner layer on the developing roller 331 or thickness unevenness thereof was observed but was not manifested in the image and thus presented no problem in practical use was indicated as "F (fair)," a case where an abnormality was observed on the developing roller 331 and on the image and thus led to unacceptable image quality was indicated as "P (poor)," and a case where thickness unevenness of the thin toner layer on the developing roller 331 and density unevenness on the image occurred and thus led to unacceptable image quality was indicated as "U (unacceptable)." Results are shown in Tables 1 to 5.

TABLE 1

| CONTACT AREA RATIO | | Rz1/Rz2 | | | |
|---|---|---|---|---|---|
| 5% | | 1.0 | 1.25 | 1.5 | 2.0 |
| CONTACT LINEAR PRESSURE OF REGULATION BLADE [N/m] | 15 | U | U | U | U |
| | 20 | G | G | G | G |
| | 30 | G | G | G | F |
| | 40 | G | G | G | F |
| | 50 | G | G | G | P |

TABLE 2

| CONTACT AREA RATIO | | Rz1/Rz2 | | | |
|---|---|---|---|---|---|
| 10% | | 1.0 | 1.25 | 1.5 | 2.0 |
| CONTACT LINEAR PRESSURE OF REGULATION BLADE [N/m] | 15 | G | G | G | G |
| | 20 | G | G | G | G |
| | 30 | G | G | G | F |
| | 40 | G | G | G | P |

TABLE 2-continued

| CONTACT AREA RATIO | | Rz1/Rz2 | | | |
| --- | --- | --- | --- | --- | --- |
| 10% | | 1.0 | 1.25 | 1.5 | 2.0 |
| | 50 | G | G | G | P |

TABLE 3

| CONTACT AREA RATIO | | Rz1/Rz2 | | | |
| --- | --- | --- | --- | --- | --- |
| 15% | | 1.0 | 1.25 | 1.5 | 2.0 |
| CONTACT LINEAR | 15 | G | G | G | G |
| PRESSURE OF | 20 | G | G | G | F |
| REGULATION BLADE | 30 | G | G | G | F |
| [N/m] | 40 | G | G | F | P |
| | 50 | G | F | F | P |

TABLE 4

| CONTACT AREA RATIO | | Rz1/Rz2 | | | |
| --- | --- | --- | --- | --- | --- |
| 20% | | 1.0 | 1.25 | 1.5 | 2.0 |
| CONTACT LINEAR | 15 | G | G | G | G |
| PRESSURE OF | 20 | G | G | G | F |
| REGULATION BLADE | 30 | G | G | F | F |
| [N/m] | 40 | G | F | F | P |
| | 50 | G | F | F | P |

TABLE 5

| CONTACT AREA RATIO | | Rz1/Rz2 | | | |
| --- | --- | --- | --- | --- | --- |
| 30% | | 1.0 | 1.25 | 1.5 | 2.0 |
| CONTACT LINEAR | 15 | P | P | P | P |
| PRESSURE OF | 20 | P | P | P | P |
| REGULATION BLADE | 30 | P | P | P | P |
| [N/m] | 40 | P | P | P | P |
| | 50 | P | P | P | P |

As shown in Table 5, in a case where the developing roller 331 had a contact area ratio of 30%, no matter how the contact linear pressure of the regulation blade 334 and Rz1/Rz2 of the developing roller 331 were adjusted, there had occurred thin layer streaks in the thin toner layer on the developing roller 331 before the number of printed sheets reached 3,000 sheets as the target life. In contrast, as shown in Tables 1 to 4, in a case where the developing roller 331 had a contact area ratio of not more than 20%, when the contact linear pressure of the regulation blade 334 was adjusted to be in the range of 15 to 50 [N/m] and Rz1/Rz2 of the developing roller 331 was adjusted to be in the range of 1.0 to 2.0, the occurrence of thin layer streaks in the thin toner layer and thickness unevenness thereof after the number of printed sheets reached 3,000 sheets could be reduced to such a range as to present no problem in practical use. In a case where the contact area ratio was 5%, when the regulation blade 334 had a contact linear pressure of 15 [N/m], there occurred thickness unevenness of the thin toner layer on the developing roller 331 and density unevenness on the image.

The foregoing results have confirmed that decreasing the contact area ratio of the developing roller 331 from a conventional value of about 30% to not more than 20% can suppress the occurrence of thin layer streaks in the thin toner layer and thickness unevenness thereof. It has been also confirmed that, while respective adjustment ranges of the contact linear pressure of the regulation blade 334 and Rz1/Rz2 of the developing roller 331 for reaching the target life (3,000 sheets) expand with decreasing contact area ratio, when the contact area ratio is not more than 5%, thickness unevenness of the thin toner layer on the developing roller 331 occurs to cause image unevenness.

(Relationship Between Electrostatic Capacity of Developing Roller and Toner Melt Adhesion)

Next, a study was made of a relationship between the electrostatic capacity of the developing roller 331 and toner melt adhesion. In a test method adopted, as the developing roller 331, rollers were manufactured so as to have Rz1/Rz2 fixed at 1.5 and vary in electrostatic capacity in six levels. The electrostatic capacity was adjusted by changing the additive amount of the electrically conductive material (carbon black) added to the surface layer of the roller portion 331*b*. Table 6 shows electrostatic capacity values of the rollers each manufactured as the developing roller 331.

TABLE 6

| ROLLER NO. | ELECTROSTATIC CAPACITY $[10^{-7}F/m^2]$ | ELECTRICALLY CONDUCTIVE MATERIAL |
| --- | --- | --- |
| 1 | 3.2 | Not Added |
| 2 | 4.3 | Added |
| 3 | 4.8 | |
| 4 | 5.7 | |
| 5 | 7.0 | |
| 6 | 7.7 | |

With the contact linear pressure of the regulation blade 334 fixed at 20 [N/m], an endurance test was carried out (1,000 sheets of test images were continuously printed), and an amount of the toner conveyed on the developing roller 331, the number of sheets printed prior to occurrence of toner melt adhesion to the regulation blade 334, and the image density (a reflection density) at the end of the endurance test were measured. For evaluation of occurrence of toner melt adhesion, it was determined whether or not white streaks had occurred in an outputted test image. Results are shown in FIG. 11 and FIG. 12.

Figure 11:
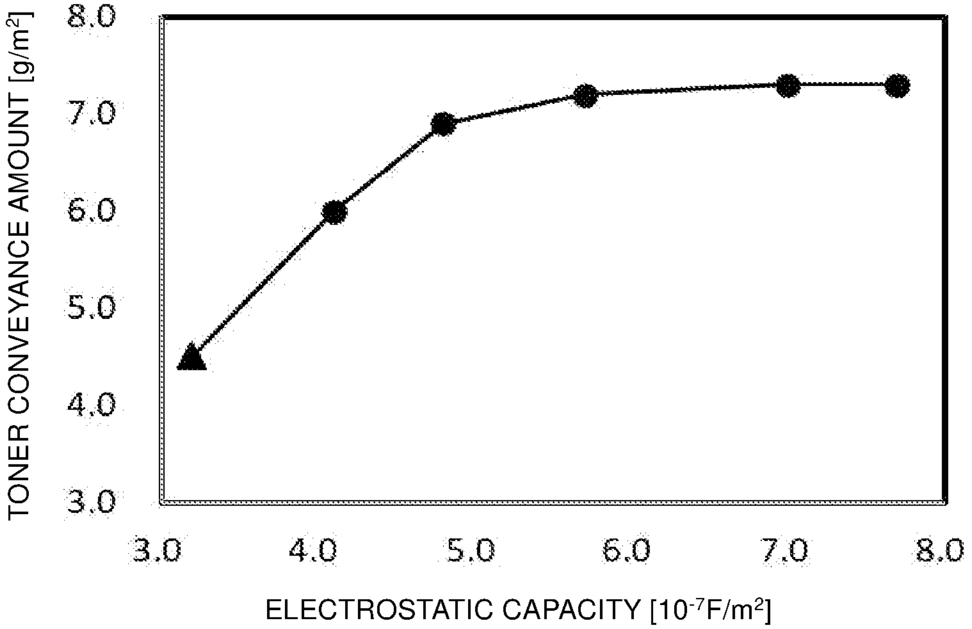
FIG. 11 is a graph showing a relationship between an electrostatic capacity of the developing roller in the developing portion and an amount of a toner conveyed.

As shown in FIG. 11, it is understood that, in a case where the electrically conductive material is added (a data series denoted with solid black circles in FIG. 11), the amount of the toner conveyed is larger than in a case where the electrically conductive material is not added (a data series denoted with a solid black triangle in FIG. 11), and that the larger the electrostatic capacity of the developing roller 331, the more the amount of the toner conveyed is increased.

Figure 12:
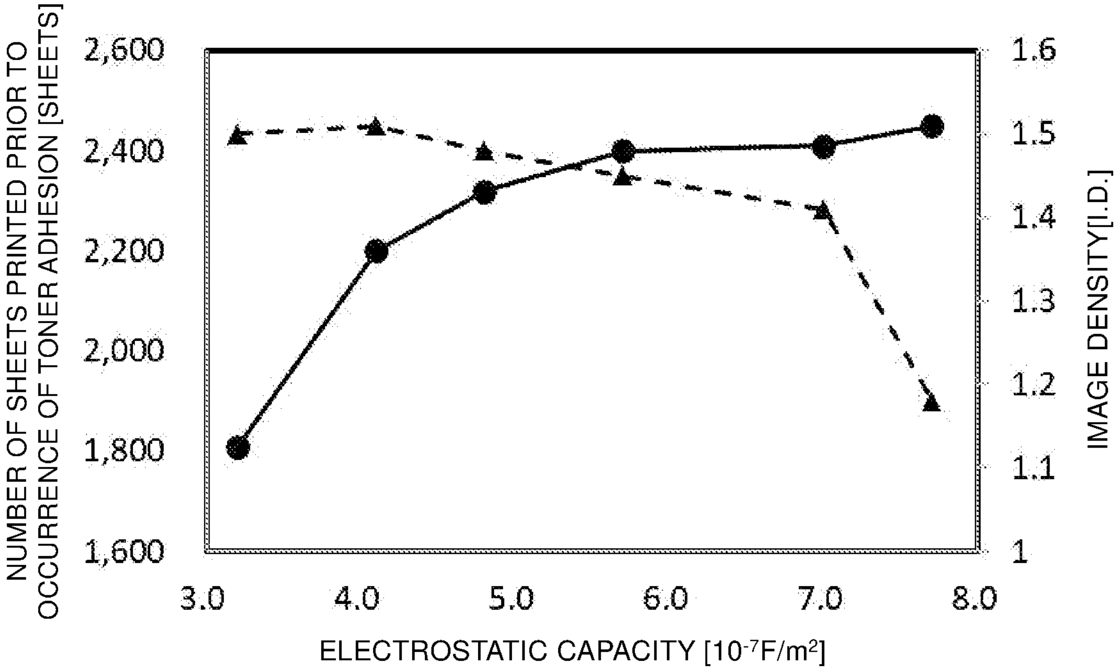
FIG. 12 is a graph showing a relationship between the electrostatic capacity of the developing roller in the developing portion and each of the number of sheets printed prior to occurrence of toner melt adhesion and an image density.

Furthermore, as shown in FIG. 12, the larger the electrostatic capacity, the more the number of sheets printed prior to occurrence of toner melt adhesion (shown by a solid line in FIG. 11) was increased (the occurrence was delayed), and it has thus been confirmed that an effect of prolonging the life of the developing portion 33 is achieved. On the other hand, the larger the electrostatic capacity, the more the image density (shown by a broken line in FIG. 11) was decreased. Conceivably, this is because of the following reason. That is, when the electrostatic capacity is excessively increased, the electric adhesion force between the developing roller 331 and the toner becomes too large, and thus the toner can no longer respond to the development electric field, so that the image density is decreased. It is understood, from the results shown in FIG. 12, that when the electrostatic capacity is in a range of not less than $4.0\times10^{-7}$ [F/m$^2$] and not more than $7.0\times10^{-7}$ [F/m$^2$], it is possible to achieve the effect of prolonging the life of the developing roller 331 with respect to toner melt adhesion and also to maintain the image density.

(Relationship Between Electrostatic Capacity and Rz1/Rz2 of Developing Roller and Toner Melt Adhesion)

With the contact linear pressure of the regulation blade 334 fixed at 20 [N/m], using, as the developing roller 331, the rollers (No. 1 and No. 4 in Table 6) that varied in electrostatic capacity in two levels, an endurance test was carried out (1,000 sheets of test images were continuously printed) in which Rz1/Rz2 was made to vary, and the number of sheets printed prior to occurrence of toner melt adhesion to the regulation blade 334 was checked. Results are shown in FIG. 13.

Figure 13:
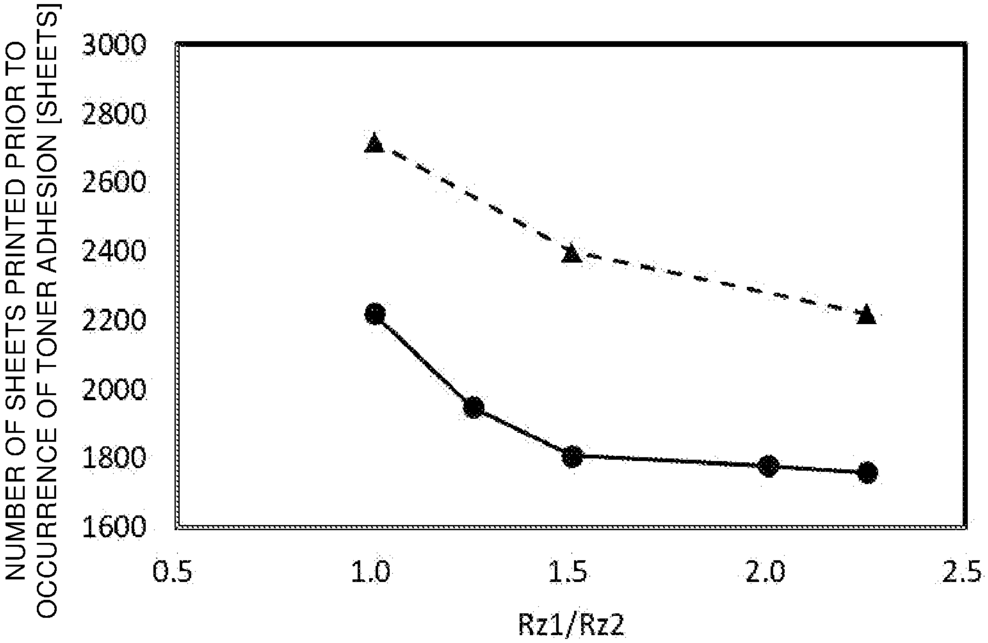
FIG. 13 is a graph showing a relationship between Rz1/Rz2 of each of two developing rollers that vary in electrostatic capacity and the number of sheets printed prior to occurrence of toner melt adhesion.

As shown in FIG. 13, in a case of one of the rollers as the developing roller 331 having an electrostatic capacity of $3.2\times10^{-7}$ [F/m$^2$] (shown by a solid line in FIG. 13), when Rz1/Rz2 was 1.0, the number of sheets printed prior to occurrence of toner melt adhesion was 2,200 sheets, whereas when Rz1/Rz2 was 1.5, the number of sheets printed prior to occurrence of toner melt adhesion was 1,900 sheets. On the other hand, in a case of the other roller as the developing roller 331 having an electrostatic capacity of $5.7\times10^{-7}$ [F/m$^2$] (shown by a broken line in FIG. 13), when Rz1/Rz2 was 1.0, the number of sheets printed prior to occurrence of toner melt adhesion was 2,700 sheets, whereas when Rz1/Rz2 was 1.5, the number of sheets printed prior to occurrence of toner melt adhesion was 2,400 sheets. These results have confirmed that a combination of decreased Rz1/Rz2 and an increased electrostatic capacity makes it possible to further enhance the effect of prolonging the life of the developing portion 33 with respect to toner melt adhesion.

(8. Other Configurations)

In the present embodiment, both of a toner manufactured by the pulverization method (a pulverized toner) and a toner manufactured by a polymerization method (a polymerized toner) can be used. Due to its truly spherical shape having a high circularity, the polymerized toner is low in adhesion force to provide good development performance and thus has a broader usable range. The present disclosure is particularly useful in the non-magnetic one-component development type using the pulverized toner that, while being less costly than the polymerized toner, has a narrower usable range.

Furthermore, in the present embodiment, it has been confirmed that the use of a toner having a central particle diameter of 6.0 to 8.0 μm provides excellent results. The reason for selecting a central particle diameter in this range is as follows. That is, a central particle diameter outside this range is not preferable in that a central particle diameter smaller than 6.0 μm leads to an increase in manufacturing cost of the toner, and a central particle diameter larger than 8.0 μm leads to an increase in toner consumption and thus to deterioration in fixability.

Furthermore, in the present embodiment, it has been confirmed that the use of a toner having a circularity of 0.93 to 0.97 provides excellent results. A circularity outside this range is not preferable for the following reason. That is, a circularity of not more than 0.93 tends to decrease image quality. A circularity of not less than 0.97 leads to a substantial increase in manufacturing cost.

Furthermore, in the present embodiment, it has been confirmed that the use of a toner having a melt viscosity of not more than 100,000 Pa·s at 90° C. provides excellent results. A melt viscosity exceeding 100,000 Pa·s at 90° C. leads to deterioration in fixability of the toner and thus is not preferable from the standpoint of energy saving.

It has been confirmed that a linear speed difference between the photosensitive drum 31 and the developing roller 331 in a range of 1.1 to 1.6 times (a linear speed of the developing roller 331 is higher than that of the photosensitive drum 31) provides similar results. A linear speed difference smaller than 1.1 times makes it likely that there occurs image fogging in which the toner adheres to a blank part of a sheet and thus is not preferable. A linear speed difference larger than 1.6 times leads to an increase in driving torque or vibrations of the developing portion 33 or an increase in physical stress on the toner and thus is not preferable from the standpoint of the life of the developing portion 33.

Furthermore, it has been confirmed that a surface potential VO in a range of 500 to 800 V and a post-exposure potential VL in a range of 70 to 200 V of the photosensitive drum 31 provide similar effects.

Other than the above, the present disclosure is not limited to the foregoing embodiment and can be variously modified without departing from the spirit of the present disclosure. For example, while the foregoing embodiment describes a monochrome printer as an example of the image forming apparatus 1, the present disclosure is applicable also to, for example, a color printer of a tandem type or a rotary type. Furthermore, the present disclosure is applicable also to an image forming apparatus such as a copy machine, a facsimile, or a multi-functional peripheral equipped with functions thereof. It is required, however, to include the photosensitive drum 31 and the developing portion 33 of the non-magnetic one-component development type. Furthermore, while the foregoing embodiment describes the configuration in which a non-magnetic toner is stored in the development housing 330 of the developing portion 33, a toner container or a toner cartridge for containing a non-magnetic toner may be provided separately from the development housing 330.

Furthermore, while the photosensitive drum 31 in the foregoing embodiment uses a cylindrical raw tube as a support, a support having any other shape may also be used. Examples of the other shape may include a plate shape and an endless belt shape. Furthermore, while the photosensitive drum 31 in the foregoing embodiment uses an amorphous silicon photoconductive layer, there may be provided, for example, an electric charge injection blocking layer that blocks injection of electric charge from the support.

The present disclosure is usable in a developing device of the non-magnetic one-component development type using a non-magnetic toner. Through the use of the present disclosure, it is possible to provide a developing device capable of, in a configuration using a non-magnetic one-component development method, effectively suppressing toner melt adhesion to a regulation blade by using a simple configuration and an image forming apparatus including the same.

What is claimed is:

1. A developing device that supplies a toner to an image carrying member on which an electrostatic latent image has been formed, the developing device comprising:

- a development container for containing a non-magnetic one-component developer composed only of the toner;
- a developer carrying member including:
  - a rotary shaft; and
  - a roller portion that is stacked on an outer circumferential surface of the rotary shaft and is brought into pressure contact at a prescribed pressing force with the image carrying member, on an outer circumferential surface of the roller portion, the toner being carried to form a toner layer; and a regulation blade that contacts the outer circumferential surface of the roller portion so as to regulate a thickness of the toner layer formed on the outer circumferential surface of the roller portion, wherein the developer carrying member is manufactured by a polishing method in which the roller portion being rotated about the rotary shaft is contacted by a grindstone so as to be polished, when a ten-point average roughness in a circumferential direction and a ten-point average roughness in an axial direction of the roller portion are indicated as Rz1 and Rz2, respectively, Rz1/Rz2≤1.5 is satisfied, and a contact linear pressure of the regulation blade with respect to the roller portion is not less than 15 [N/m] and not more than 40 [N/m], wherein a contact area ratio of the developer carrying member is defined as a ratio of an area of actual contact between the outer circumferential surface of the roller portion and a plane of a pressing member to an area of a nip between the outer circumferential surface and the plane when made to contact the outer circumferential surface at a linear pressure of 50 [N/m], and the developer carrying member has asperities provided on the outer circumferential surface so that the contact area ratio is not less than 5% and not more than 20%.

2. The developing device according to claim 1, wherein 2 [μm]≤Rz2≤20 [μm] is satisfied.

3. The developing device according to claim 2, wherein 3 [μm]≤Rz2≤15 [μm] is satisfied.

4. The developing device according to claim 1, wherein Rz1/Rz2=1.0 is satisfied.

5. The developing device according to claim 1, wherein the pressing member is a prism having a shape of an isosceles right triangle as viewed sideways, and with the outer circumferential surface being contacted at a linear pressure of 50 [N/m] by a plane of the prism interposed between two mutually perpendicular planes of the prism, a contact state between the outer circumferential surface and the plane when light is made incident on one of the two mutually perpendicular planes is observed through another one of the two mutually perpendicular planes, and the contact area ratio of the developer carrying member determined based on the contact state is not less than 5% and not more than 20%.

6. The developing device according to claim 1, wherein the roller portion of the developer carrying member has an electrostatic capacity of not less than $4.0\times10^{-7}$ [F/m$^2$] and not more than $7.0\times10^{-7}$ [F/m$^2$].

7. The developing device according to claim 1, wherein the toner is manufactured by a pulverization method.

8. An image forming apparatus, comprising:

an image carrying member including a photosensitive layer formed on a surface thereof;

a charging device that charges the image carrying member to a prescribed surface potential;

an exposure device that exposes to light the surface of the image carrying member charged by the charging device so that an electrostatic latent image with attenuated electrostatic charge is formed thereon; and the developing device according to claim 1, which supplies the toner to the image carrying member on which the electrostatic latent image has been formed.

* * * * *